(No Model.) 2 Sheets—Sheet 1.
J. W. WETMORE.
VEHICLE SPRING.
No. 289,046. Patented Nov. 27, 1883.
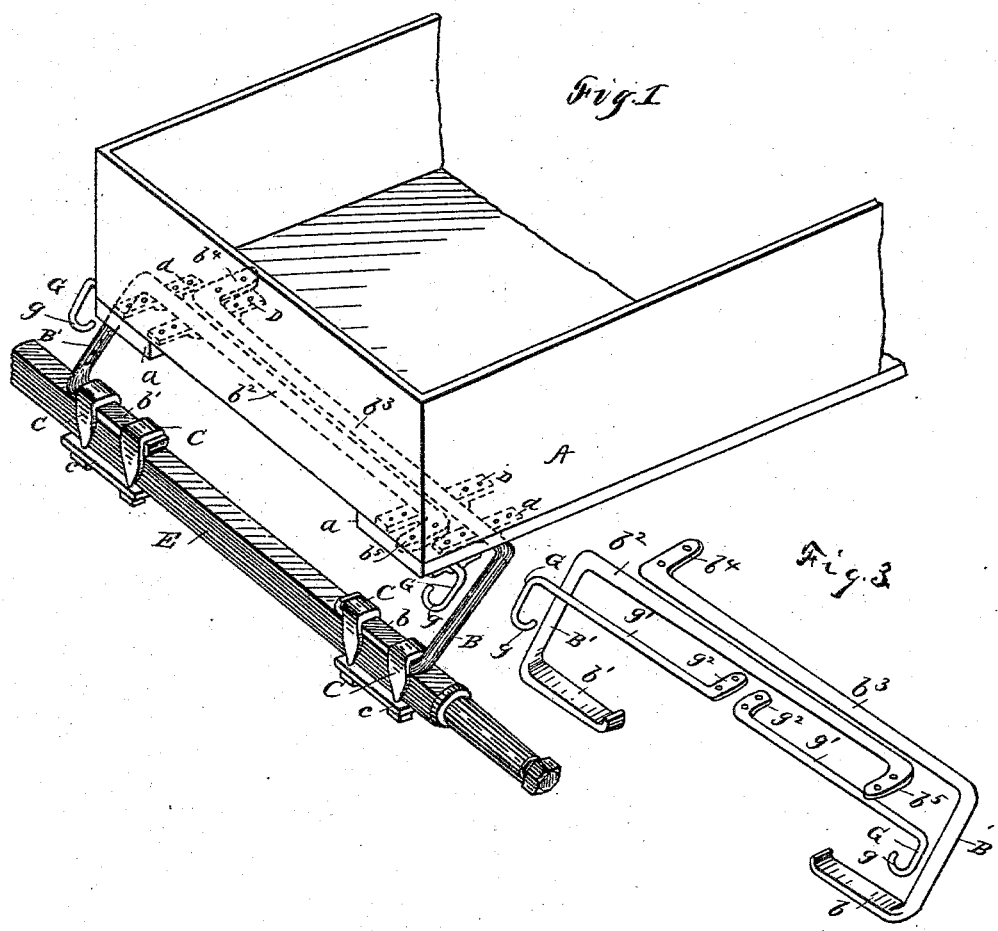
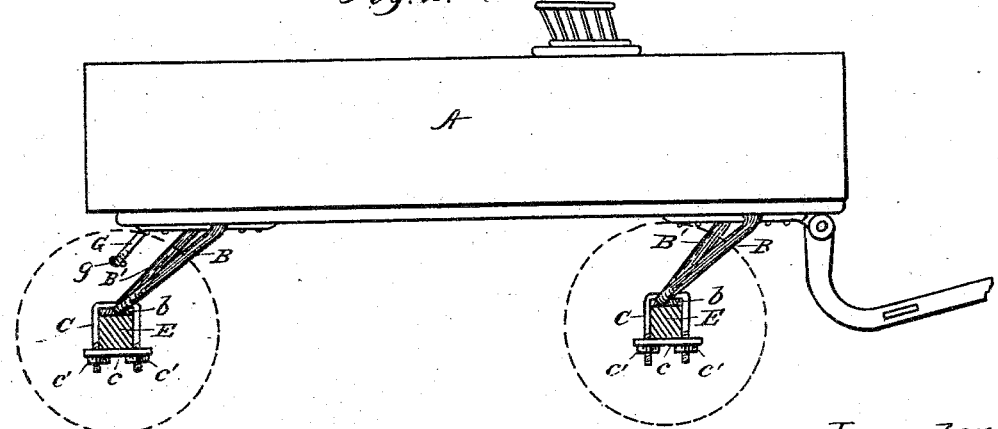
Witnesses
W. R. Edelen
L. J. VanAnden
Inventor
Jerome W. Wetmore

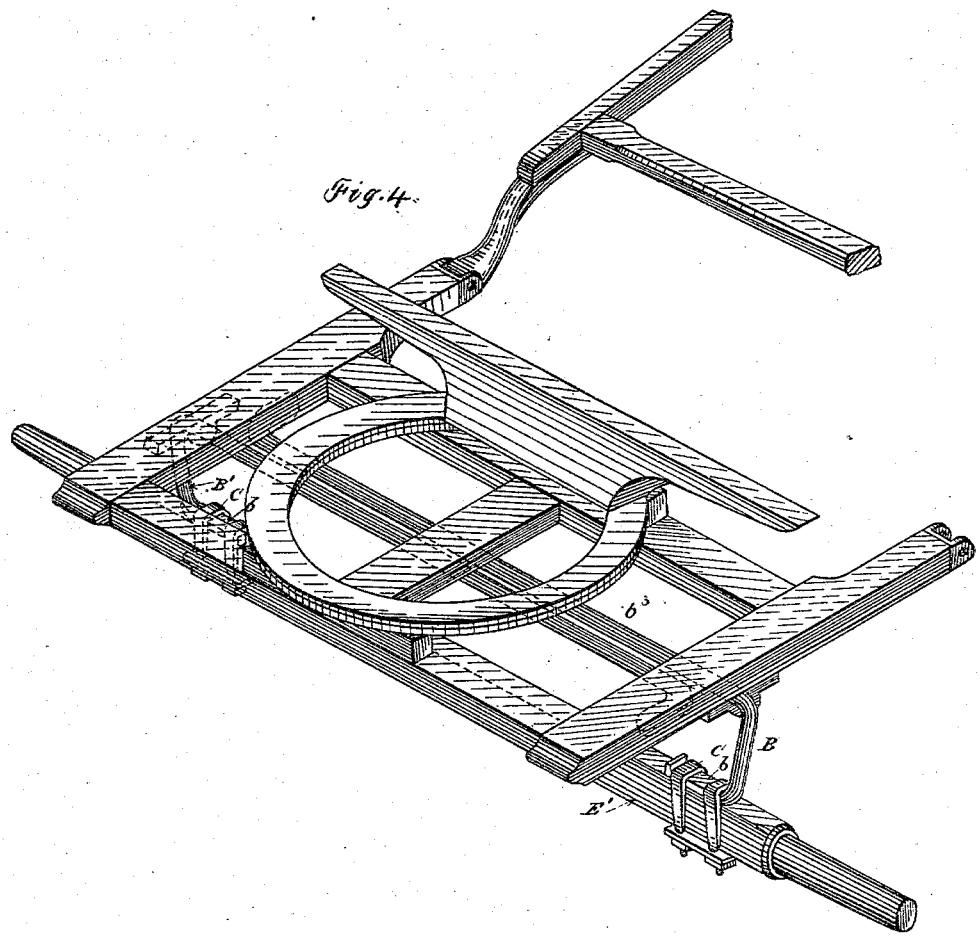

UNITED STATES PATENT OFFICE.

JEROME W. WETMORE, OF ERIE, PENNSYLVANIA.

VEHICLE-SPRING.

SPECIFICATION forming part of Letters Patent No. 289,046, dated November 27, 1883.

Application filed October 21, 1882. (No model.)

*To all whom it may concern:*

Be it known that I, JEROME W. WETMORE, a citizen of the United States, residing at Erie, in the county of Erie and State of Pennsylvania, have invented a new and useful Improvement in Vehicle-Springs, of which the following is a specification.

My invention relates to improvements in torsion-springs for vehicles when they connect the axles more directly with the body of the vehicle.

The objects of the improvement are as follows: Similar springs have been connected with fixed axles by hinged links, by means of which the increased lengths of the arms of the springs horizontally, arising from the depression under weight and motion, are provided for. In my invention I provide for the longitudinal variation of the spaces occupied by the spring, arising from its depressions and reactions, by attaching the lever-arm of the spring firmly to the axle, and making the wheel and axle, by the consequent modifications of their usual motions, receive all the longitudinal variations of the spring. My object is also to make an economical and simple connection of the fore and hind axles through the usual platform. I attain these objects by the devices illustrated in the following drawings, in which—

Figure 1 is a perspective view of the springs on the hind axle of a vehicle; Fig. 2, a side view of the vehicle and springs; Fig. 3, a view of the springs detached from the body and axle. Fig. 4 represents the forward axle and platform, with the fifth-wheel connected by the springs.

The head-block above the fifth-wheel is, in fact, farther back, and the spring $b^3$ farther forward, under the platform than represented. The connections of the springs to the fifth-gearing of the fifth-wheel and to this axle are substantially the same as those on the hind axle and the body of the vehicle.

A is the body of the vehicle; $b$ B $b^3$ and $b'$ B' $b^2$, the main springs; C, the clips holding the spring to the axle; $d\ d$, the clips, (holding the springs B B',) in which these springs have a reciprocating rotary motion; D D, clips holding the ends $b^4$ and $b^5$ firmly by the aid of the bolts in their ends; E, the axle; G G, auxiliary springs. The ends $g\ g$ are directly above B B. When the weight depresses the body A and the torsion-sections $b^2\ b^3$, the arms B B' strike in the small arcs $g\ g$. G G thus become auxiliary springs in case of extreme weight and depression.

A fifth-wheel and platform, in the usual form, are constructed above B B' in the forward end, Fig. 2.

The ends of the springs $b\ b'$, Fig. 1, are constructed and set so that the vertical longitudinal plane inclines back from a vertical line nearly one-half of the angle made by the arms B B' with the body A of the vehicle. The arm B' is shorter than B, so that the torsion-sections $b^2\ b^3$ can both rest on the frame of A. The angle of the horizontal plane of E with the arm B' is consequently made a little greater than with the arm B. When the weight in A or the action of the vehicle in motion causes the body A to be depressed or E to rise, or both, the torsion-bars $b^2\ b^3$ turn in their bearings $d\ d$, (brass or other friction-plates being placed between them and the frame of the body A,) and the axle to an equal degree turns in the hubs of the wheel, while the axle itself moves back or lags (when the vehicle is moving forward) the distance of the versed sine of the arc through which the axle moves around $b^2\ b^3$ as centers.

I do not claim the torsion-spring attached under the body of the vehicle, and its arms running at right angles and hinged by a link or clip to the axle, either alone or in combination with equalizers or half-elliptical springs, nor the torsion-spring with a forged clip on one end of its arm to attach it to the axle, and the other end of its arm connected to it by mortise and tenon.

I do not claim the spring with a head-block attachment that makes it necessary to fasten the thills or pole rigidly to the axle.

What I claim is—

1. The torsion-spring, with the upset end $b$, Fig. 3, constructed to be held rigidly by a clip at its junction with the axle, the arm B being continuous with $b$, $b^3$, and $b^4$, the right angles of the several posts being strengthened by upsetting, in combination with the axle and body or gears of the vehicle, the spring being constructed and attached to them at angles, substantially as described.

2. The combination of the torsion-spring $b^3$, Fig. 4, with the axle and gearing of the fifth-wheel of the vehicle, all constructed and attached together substantially as described.

3. The auxiliary spring G G, in combination with the spring $b^3$ and arms B, Fig. 3, substantially as described.

JEROME W. WETMORE.

Witnesses:
 WM. P. HAYES,
 L. J. VAN ANDEN.